US008593643B2

(12) United States Patent  
Kim et al.

(10) Patent No.: US 8,593,643 B2  
(45) Date of Patent: Nov. 26, 2013

(54) METHODS AND APPARATUS FOR DIRECT-GLOBAL SEPARATION OF LIGHT USING ANGULAR FILTERING

(75) Inventors: Jaewon Kim, Cambridge, MA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 387 days.

(21) Appl. No.: 12/700,654

(22) Filed: Feb. 4, 2010

(65) Prior Publication Data

US 2011/0191073 A1 Aug. 4, 2011

(51) Int. Cl.
- *G01B 11/24* (2006.01)
- *G01N 21/00* (2006.01)
- *G06K 9/00* (2006.01)

(52) U.S. Cl.
USPC .................. 356/601; 356/239.6; 382/154

(58) Field of Classification Search
USPC .............. 345/426; 356/601–623; 396/33
See application file for complete search history.

(56) References Cited

U.S. PATENT DOCUMENTS

2007/0285422 A1* 12/2007 Nayar et al. ............... 345/426
2010/0098323 A1* 4/2010 Agrawal et al. ........... 382/154

OTHER PUBLICATIONS

Lanman et al. ("Shield Fields: Modeling and Capturing 3D Occluders"); ACM Transactions on Graphics (TOG) ; vol. 27 Issue 5, Dec. 2008; Article No. 131.*
Talvala et al., Veiling Glare in High Dynamic Range Imaging, ACM Transactions on Graphics, vol. 26, No. 3, Article 37, Jul. 2007.*
B. Atcheson, I. Ihrke, W. Heidrich, A. Tevs, D. Bradley, M. Magnor, H. Seidel; Time-resolved 3D Capture of Non-stationary Gas Flows, Proc. of ACM SIGGRAPH Asia 2008, Session: Image-based capture, ACM Transactions on Graphics, vol. 27, Issue 5, Article 132 (Dec. 2008), ACM New York, NY USA.
R. Ng, M. Levoy, M. Bredif, G. Duval, M. Horowitz, P. Hanrahan; Light Field Photography with a Hand-Held Plenoptic Camera, Stanford University Computer Science Tech Report CSTR Apr. 2005, Stanford University Stanford CA USA.
B. Sun, R. Ramamoorthi, S. Narasimhan, S. Nayar; A Practical Analytic Single Scattering Model for Real Time Rendering, Proc. of ACM SIGGRAPH 2005, ACM Transactions on Graphics, vol. 24, Issue 3, pp. 1040-1049 (Jul. 2005), ACM New York, NY USA.
Y. Mukaigawa, K. Suzuki, Y. Yagi; Analysis of Subsurface Scattering based on Dipole Approximation; IPSJ Transactions on Computer Vision and Applications, vol. 2009 pp. 0-10 (2009); Information Processing Society of Japan, Tokyo Japan.

(Continued)

*Primary Examiner* — Gregory J Toatley
*Assistant Examiner* — Rufus Phillips
(74) *Attorney, Agent, or Firm* — Stephen R. Otis

(57) ABSTRACT

In an exemplary implementation of this invention, light from a scattering scene passes through a spatial light attenuation pattern and strikes a sensor plane of a camera. Based on said camera's measurements of the received light, a processing unit calculates angular samples of the received light. Light that strikes the sensor plane at certain angles comprises both scattered and directly transmitted components; whereas light that strikes at other angles comprises solely scattered light. A processing unit calculates a polynomial model for the intensity of scattered-only light that falls at the latter angles, and further estimates the direct-only component of the light that falls at the former angles. Further, a processing unit may use the estimated direct component to calculate a reconstructed 3D shape, such as a 3D shape of a finger vein pattern, using an algebraic reconstruction technique.

20 Claims, 14 Drawing Sheets

(56) References Cited

OTHER PUBLICATIONS

S. Nayar, G. Krishnan, M. Grossberg, R. Raskar; Fast Separation of Direct and Global Components of a Scene using High Frequency Illumination, Proc. of ACM SIGGRAPH 2006, ACM Transactions on Graphics, vol. 25, Issue 3 pp. 935-944 (Jul. 2006) ACM New York, NY USA.

O. Nasu, S. Hiura, K. Sato; Analysis of Light Transport based on the Separation of Direct and Indirect Components, cvpr, pp. 1-2, 2007 IEEE Conference on Computer Vision and Pattern Recognition (2007) IEEE New York, NY USA.

Y. Roh, W. Park, H. Cho, H. Jeon; An Implementation of Uniform and Simultaneous Art for 3D Volume Reconstruction in X-ray Imaging System; Optomechatronic Systems III, edited by T. Yoshizawa, Proceedings of SPIE vol. 4902 pp. 576-587 (2002), SPIE, Bellingham WA.

D. Lanman, R. Raskar, A. Agrawal, G. Taubin; Shield Fields: Modelling and Capturing 3D Occluders; Proc. of ACM SIGGRAPH Asia 2008, ACM Transactions on Graphics, vol. 27, Issue 5, (Dec. 2008) ACM, New York, NY USA.

B. Trinofov, D. Bradley, W. Heidrich; Tomographic Reconstruction of Transparent Objects; International Conference on Computer Graphics and Interactive Techniques, ACM SIGGAPH 2006, Article 55 (2006), ACM New York, NY, USA.

N. Miura, A. Nagasaka, T. Miyatake; Feature extraction of finger-vein patterns based on repeated line tracking and its application to personal identification; Machine Vision and Applications, vol. 15, Issue 4, pp. 194-203 (Oct. 2004), Springer-Verlag, New York, NY, USA.

J. Gu, S. Nayar, E. Grinspun, P. Belhumeur, R. Ramamoorthi; Compressive Structured Light for Recovering Inhomogeneous Participating Meida, European Conference on Computer Vision (ECCV) (Oct. 2008).

H. Okugawa; A new imaging method for confocal microscopy; Multiphoton Microscopy in the Biomedical Sciences VIII, edited by A. Periasamy, P. So; Proc. of SPIE vol. 6860, pp. 68600K to 68600K-7 (2008); SPIE Bellingham WA, USA.

R. Gauderon, C. Sheppard; Improvement in imaging in confocal fluorescent microscopes using multiple detectors; Bioimaging, vol. 6, Issue 3, pp. 126-129 (1998), IOP Publishing Ltd. Bristol UK.

S. Seitz, Y. Matsushita, K. Kutalakos; A Theory of Inverse Light Transport; Proc. of Tenth IEEE International Conference on Computer Vision (ICCV), vol. 2, pp. 1440-1447 (2005), IEEE Computer Society, Washington D.C. USA.

A. Pentland; A New Sense for Depth of Field; Proc. of 9th International Joint Conference on Artificial Intelligence, vol. 2, pp. 988-994 (1985) Morgan Kaufmann Publishers Inc., San Francisco, CA, USA.

C. Sheppard, C. Cogswell; Confocal microscopy with detector arrays; Journal of Modem Optics, vol. 37, No. 2, pp. 267-279 (1990) Taylor & Francis Ltd.

D. Boas, A. Dale, M. Franceschini; Diffuse optical imaging of brain activation: approaches to optimizing image sensitivity, resolution, and accuracy; Neuroimage, 23 Suppl 1; pp. S275-S288 (2004); Elsevier Inc., Amsterdam.

D. Boas, D. Brooks, E. Miller, C. DiMarzio, M. Kilmer, R. Gaudette, Q. Zhang; Imaging the Body with Diffuse Optical Tomography; IEEE Signal Processing Magazine, vol. 18, Issue 6, pp. 57-75 (Nov. 2001), IEEE Signal Processing Society, Piscataway, NJ USA.

X. Pan, E. Sidky, M. Vannier; Why do commercial CT scanners still employ traditional, filtered back-projection for image reconstruction?; Inverse Problems, vol. 25, No. 12, pp. 1-36 (Dec. 2009), IOP Publishing Ltd. Bristol UK.

M. Levoy, B. Chen, V. Vaish, M. Horowitz, I. McDowall M. Bolas; Synthetic Aperture Confocal Imaging; Proc. of ACM SIGGRAPH 2004, ACM Transactions on Graphics, vol. 23, Issue 3, pp. 825-834, ACM New York, NY USA.

S. Gortler, R. Grzeszczuk, R. Szeliski, M. Cohen; The Lumigraph; Proc. of 23rd annual conference on computer graphics and interactive techniques, pp. 43-54 (1996) ACM New York, NY USA.

M. Hullin, M. Fuchs, B. Ajdin, I. lhrke, H. Seidel, H. Lensch; Direct Visualization of Real-World Light Transport; 13th International Fall Workshop on Vision, Modeling and Visualization, pp. 363-371 (2008) Akademische Verlagsgesellschaft AKA Heidelberg Germany.

S. Narasimhan, S. Nayar; Shedding Light on the Weather; Proc. of 2003 IEEE Computer Society Conference on Computer Vision and Pattern Recognition (CVPR'03), vol. 1 (2003), IEEE Computer Society Washington, D.C. USA.

S. Narasimhan, S. Nayar, B. Sun, S. Koppal; Structured Light in Scattering Media; Proc. of the Tenth IEEE Conference on Computer Vision (ICCV'05) vol. 1—vol. 01, pp. 420-427 (2005), IEEE Computer Society Washington, D.C. USA.

J. Rosen, D. Aboukasis; Noninvasive optical imaging by speckle ensemble; Optical Letters, vol. 29, Issue 3, pp. 253-255 (2004) Optical Society of America, Washington D.C. USA.

J. Fujimoto, Optical Coherence Tomography, C.R. Acad. Sci. Paris, t. 2, Series IV, pp. 1099-1111 (2001) Elsevier Amsterdam.

J. Schmitt, A. Knuttel, M. Yadlowsky and M. Eckhaus; Optical-coherence tomography of dense tissue: statistics of attenuation and back-scattering; Physics in Medicine and Biology, vol. 39, No. 10, pp. 1705-1720 (1994) IOP Publishing Ltd., Bristol UK.

E. Adelson, J. Wang; Single Lens Stereo with a Plenoptic Camera; IEEE Transactions on Pattern Analysis and Machine Intelligence, vol. 14, Issue 2, pp. 99-106 (Feb. 1992), IEEE Computer Society, Washington D.C. USA.

A. Gibson, J. Hebden, S. Arridge; Recent advances in diffuse optical imaging; Physics in Medicine and Biology, vol. 50, No. 4, pp. R1-R43 (2005) IOP Publishing Ltd., Bristol UK.

H. Jensen, S. Marschner, M. Levoy, P. Hanrahan; A Practical Model for Subsurface Light Transport; Proc. of 28th annual conference on computer graphics and interactive techniques; pp. 511-518 (2001), ACM New York, NY USA.

Fehr, J.; Physics of Imaging, Lecture II, Light Fields, Heidelberg Collaboratory for Image Processing, accessed online on Jun. 9, 2013 at http://hci.iwr.uni-heidelberg.de/Staff/jfehr/IP_LF.pdf.

* cited by examiner

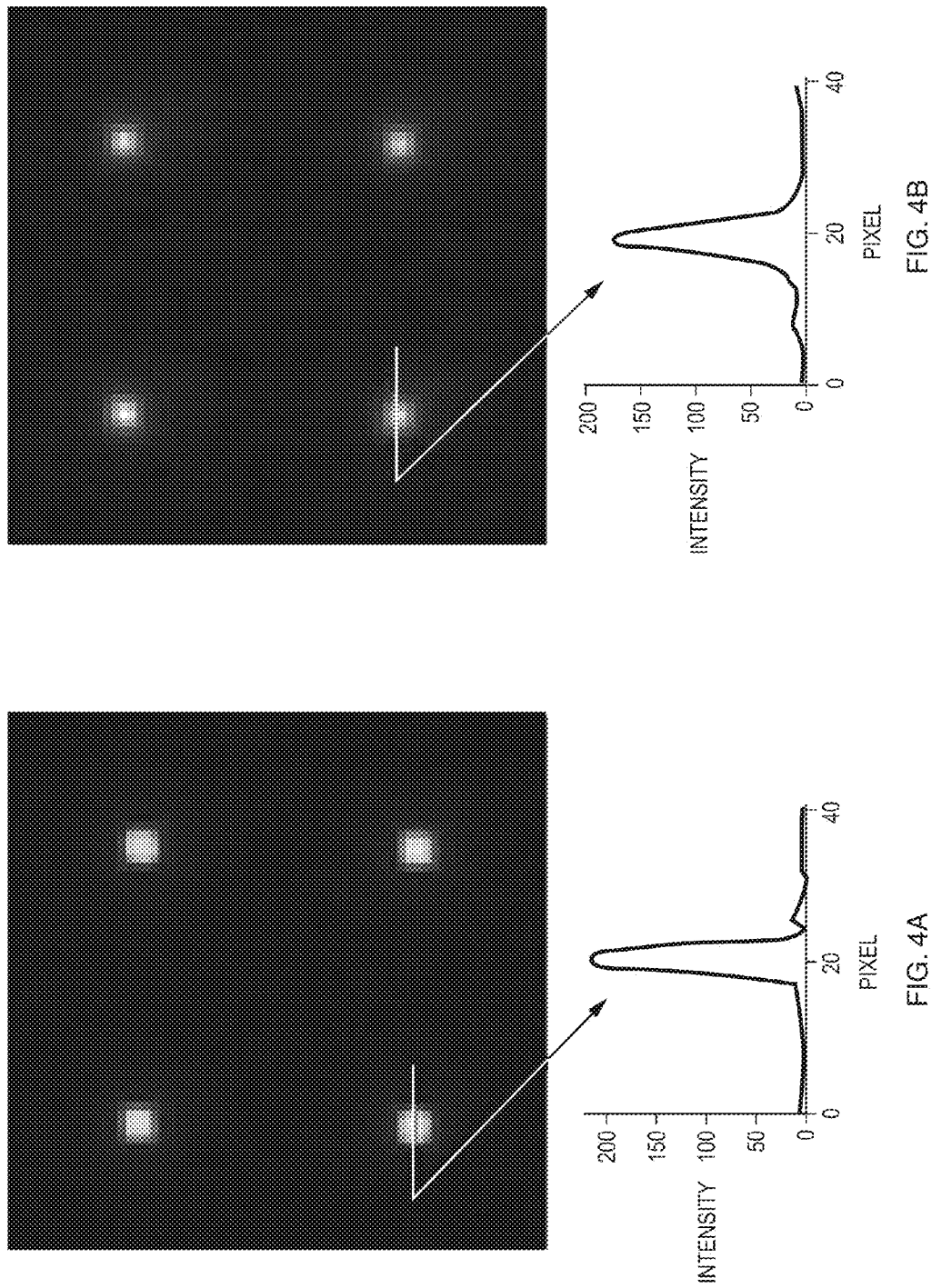

METHODS AND APPARATUS FOR DIRECT-GLOBAL SEPARATION OF LIGHT USING ANGULAR FILTERING

FIELD OF THE INVENTION

This invention relates generally to imaging.

COMPUTER PROGRAM LISTING

The ASCII text file named DirectScatteredComponents-SourceCode.txt, created Nov. 30, 2009, with a size of 17,008 bytes, sets forth a computer program listing for an exemplary implementation of this invention. That ASCII text file is incorporated by reference herein.

BACKGROUND OF THE INVENTION

Vein patterns inside a person's fingers may be used to verify a person's identity. Vein patterns are different for each finger and for each person. Because they are hidden underneath the skin's surface, forgery is extremely difficult. Also, they are not changed by aging, unlike other major biometrics such as fingerprint, face and voice.

Sony Corp. and Hitachi Ltd. have each developed finger vein authentication apparatus that use two-dimensional (2D) projection images of vein patterns. These apparatus use multiple near infrared LED (light emitting diodes) to illuminate a finger. The near infrared light penetrates the finger. Some of that light is scattered, and some is absorbed by hemoglobin in veins. An image sensor, such as a CCD (charge-coupled device) camera, captures an image. The veins appear as dark pixels in that image.

These existing techniques using a 2D projection image are, however, prone to error. Actual vein patterns have a complex three dimensional (3D) structure; whereas a 2D projection image of this 3D structure gives just perspective information viewed from one direction. Thus, vein patterns in a 2D projection image depend sensitively on the rotational and translational position of a finger. In other words, a 2D projection image of the veins may change greatly due to a minor change in the position of a finger. For example, a slight rotation of a finger may cause a 2D projection image of veins to change dramatically, increasing the risk of erroneous vein pattern recognition.

SUMMARY OF THE INVENTION

For finger vein pattern authentication, it is advantageous to be able to determine 3D vein structure, rather than merely a 2D projection image of the veins. In an exemplary implementation of this invention, light-detecting apparatus may determine a 3D pattern of a person's finger veins. This 3D pattern may be used to authenticate the identity of that person.

According to principles of this invention, such apparatus may take angular samples of light from a scattering scene (i.e., a scene in which light is scattered) to estimate the global and direct components of such light. The global portion comprises scattered light from the scene; whereas the direct portion comprises light directly transmitted from an object or objects in the scene.

In exemplary implementations of this invention, light rays received from a scattering scene strike the imaging plane of a light-detecting apparatus at different angles. This invention may be implemented in such a way that: (a) light incident at some angles is composed of both globally-scattered light and directly transmitted light, whereas (b) light incident at other angles is comprised solely of globally-scattered light.

For example, this invention may be implemented in such a way that: (a) light that strikes this imaging plane almost head-on (i.e., within a specified range of "small angles" between the light ray and a line normal to the imaging surface) is composed of both global and direct components, whereas (b) light that strikes this imaging plane at a greater angle (i.e., within a specified range of "large angles" between the ray and a line normal to the imaging surface) is composed solely of globally-scattered light. (To be clear, the angle between a light ray and a line normal to the imaging plane is less for small angles and greater for large angles.) The exact range of angles that constitute a small angle (for which both global and direct light is received) and the exact range of angles that constitute a large angle (for which only direct light is received) varies depending on the particular implementation of this invention.

According to principles of this invention, a polynomial model may be calculated to fit the measured intensity of global-only light incident at large angles. That polynomial model may be used to estimate the intensity of the global component of the light incident at small angles. The direct component of light incident at small angles may be estimated by subtracting the estimated global component incident at small angles from the measured total intensity incident at small angles.

Analyzing light from a scattering scene in this way—i.e., by calculating its global and direct components—is advantageous. The estimated direct component may be used to restore high-frequency details and to provide strong edge cues in images. Moreover, a processing unit may use the estimated direct component to calculate a reconstructed 3D shape, such as a 3D shape of a finger vein pattern.

This invention may be implemented in such a manner as to reconstruct a 3D shape of solid object enveloped in a solid object, which is a common scenario in medical imaging. An advantage of this invention is that it allows 3D reconstruction using visible-wavelength light sources (rather than, say, x-ray sources).

This invention may be implemented as apparatus comprising, in combination: (a) at least one sensor for taking measurements of light, and (b) at least one processing unit for calculating, based on said measurements, the angle-dependent intensity of said light and for calculating an amount of light intensity due only to scattered light and an amount of light intensity due only to directly transmitted light. Furthermore: (1) at least one said processing unit may be adapted for calculating a model of the intensity of scattered-only light, based on measurements of light that strikes said sensor within a specified range of angles; (2) said apparatus may be implemented in such a manner that light comprised of substantially only scattered light strikes said sensor at an angle that falls within a first range of angles, and that light comprised of both scattered and directly transmitted light strikes said sensor at an angle that falls within a second range of angles, and that at least one said processing unit is adapted for calculating, based on said measurements of light striking said sensor within said first range of angles, a model of the intensity of scattered-only light; (3) said model may be a polynomial model; (4) at least one said processing unit may be adapted for calculating the intensity of the directly transmitted component of light striking said sensor within said second range of angles, by calculating, based on said model, an estimated scattered component and subtracting said estimated scattered component from a measured intensity of said light; (5) at least one said processing unit may also be adapted to calculate, based on said calculated intensity of directly-transmitted light, at least one three-dimensional shape of an object; (5) said object may comprise a portion of a person's or animal's body; (6) said object may comprise at least part of a vein in a finger, (7) said measured light may comprise infrared light, (8) at least one said processing unit may be adapted to compare data indicative of said calculated three-dimensional shape with data indicative of shapes of other objects.

This invention may be implemented as apparatus comprising, in combination: (a) at least light detector for measuring light after said light has passed through a spatial light attenuation pattern, and (b) at least one processing unit for (I) calculating the direction-dependent intensity of at least some of said light, and (II) calculating which portion of said intensity is due to scattered light and which portion of said intensity is due to directly transmitted light. Furthermore: (1) at least one said processing unit may be adapted for calculating a polynomial model of the intensity of light rays that strike a sensor plane of said light detector within a specified range of angles; (2) said apparatus may be adapted for determining the direction-dependent intensity of light based on variations in intensity of light in the spatial domain; (3) said spatial light attenuation pattern may comprise an array of pinholes and said apparatus may be adapted such that (I) light passing through a pinhole and striking a sensor plane of said light detector in one area is comprised of both scattered light and directly transmitted light, (II) light passing through said pinhole and striking a sensor plane of said light detector in a second area is comprised of substantially only scattered light, and (III) a line normal to said sensor plane intersects both a point in said first area and the center of said pinhole; (5) at least one said processing unit may be adapted for (i) calculating, based on said measurements of light striking said sensor plane in said second area, a polynomial model of the intensity of scattered light, and (ii) calculating the intensity of the directly transmitted component of light striking a pixel in said first area, by calculating, based on said model, an estimated scattered component of said light at said pixel and subtracting said estimated scattered component from a total measured intensity of light at said pixel; (6) said spatial light attenuation pattern may comprise a MURA pattern; (7) said spatial light attenuation pattern may comprise a tiled broadband pattern; (8) a sequence of images may be taken over a period of time and a source of said light may be moved during said period relative to said light detector.

This invention may be implemented as a method comprising the following steps, in combination: (a) using at least one camera to measure the intensity of light, and (b) using at least one processing unit (I) to calculate the angle of at least some of the rays comprising said light, and (II) to calculate the amount of measured light intensity attributable to scattered light and the amount of measured light intensity attributable to directly transmitted light. This method may further comprise the step of calculating a polynomial model of the intensity of scattered light, based on measurements of light that strikes a sensor plane of said camera within a specified range of angles.

BRIEF DESCRIPTION OF THE DRAWINGS

In the detailed description which follows, reference will be made to the attached drawings.

FIGS. 4A and 4B show pinhole images, obtained when a scattering object is present and when it is not present, and related charts showing received light intensity in those scenarios, in an illustrative implementation of this invention.

DETAILED DESCRIPTION

For finger vein pattern authentication, it is advantageous to be able to determine 3D vein structure, rather than merely a 2D projection image of the veins. In an exemplary implementation of this invention, light-detecting apparatus may determine a 3D pattern of a person's finger veins. This 3D pattern may be used to authenticate the identity of that person.

According to principles of this invention, such apparatus may take angular samples of light from a scattering scene (i.e., a scene in which light is scattered) to estimate the global and direct components of such light. The global portion comprises scattered light from the scene; whereas the direct portion comprises light directly transmitted from an object or objects in the scene.

In exemplary implementations of this invention, light rays received from a scattering scene strike the imaging plane of a light-detecting apparatus at different angles. This invention may be implemented in such a way that: (a) light incident at some angles is composed of both globally-scattered light and directly transmitted light, whereas (b) light incident at other angles is comprised solely of globally-scattered light.

For example, this invention may be implemented in such a way that: (a) light that strikes this imaging plane almost head-on (i.e., within a specified range of "small angles" between the light ray and a line normal to the imaging surface) is composed of both global and direct components, whereas (b) light that strikes this imaging plane at a greater angle (i.e., within a specified range of "large angles" between the ray and a line normal to the imaging surface) is composed solely of globally-scattered light. (To be clear, the angle between a light ray and a line normal to the imaging plane is less for small angles and greater for large angles.) The exact range of angles that constitute a small angle (for which both global and direct light is received) and the exact range of angles that constitute a large angle (for which only direct light is received) varies depending on the particular implementation of this invention.

According to principles of this invention, a quadratic polynomial model may be calculated to fit the measured intensity of global-only light incident at large angles. That polynomial model may be used to estimate the intensity of the global component of the light incident at small angles. The direct component of light incident at small angles may be estimated by subtracting the estimated global component incident at small angles from the measured total intensity incident at small angles.

Figure 1:
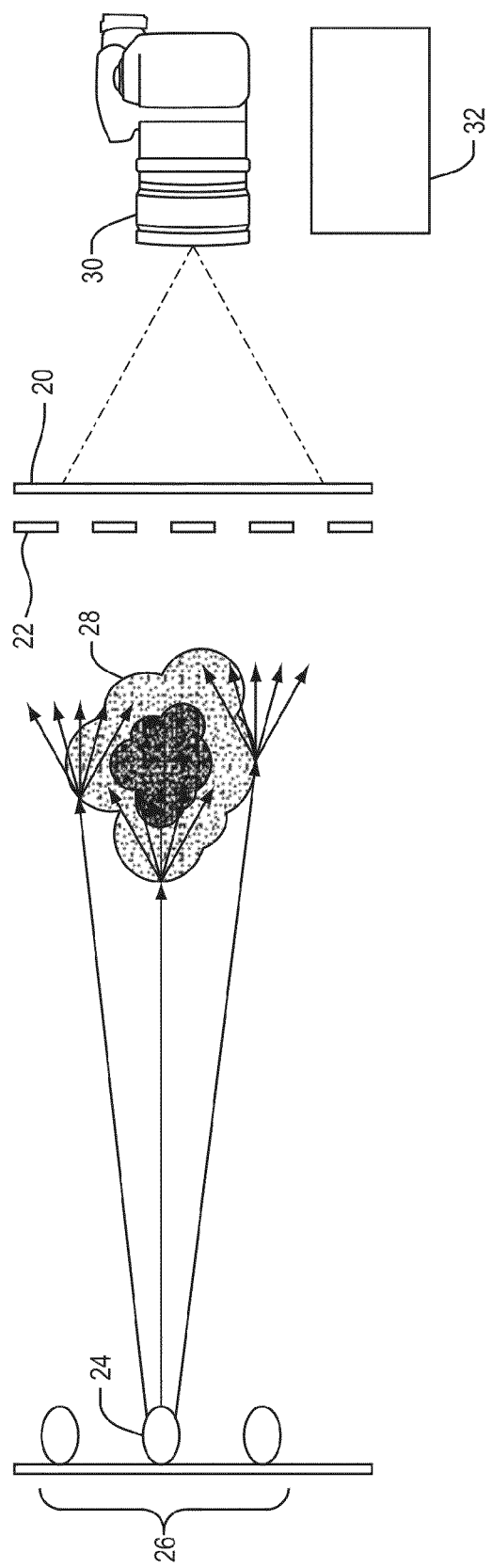
FIG. 1 is a diagram that shows scattering and translucent objects in front of pinhole array mask and diffuser screen, in an implementation of this invention.

FIG. 1 illustrates an imaging system, in an exemplary implementation of this invention. A diffuser 20 is placed a short distance behind a pinhole array mask 22. Light from one or more LEDs 26 strikes scattering and translucent objects 28. Part of that light is scattered and, after multiple scattering events, ultimately passes through the pinhole mask 22 and strikes the diffuser screen 20. Another part of that light is transmitted directly from those objects through the pinhole mask 22 to the diffuser screen 20. The result 2-D diffuser-plane image is captured by a single, high-resolution digital camera 30 placed at behind the diffuser screen (i.e., away from the scene.

FIG. 1 illustrates a simple geometric scattering model for light emitted from a point source in an exemplary implementation of this invention. The point source is an LED 24, which is one of a plurality of LEDs 26. When each ray impinges on a scattering center (e.g., a solid or gaseous mixture) 28, a new light source is effectively created. The angular variation of this scattering center is given by its phase function. The heterogeneous scattering media (which may include solids and gaseous mixtures) 28 is dominated by multiple scattering events. A subset of directly-transmitted and scattered global rays eventually strike a diffusing screen 20 after passing through a pinhole array mask 22. The resulting 2-D diffuser-plane image is captured by a single, high-resolution digital camera 30 placed at on the opposite of the screen (i.e., away from the scattering scene). The camera outputs data representing the image. A processing unit 32 analyzes this data to calculate the direct and scattered components of light striking the diffuser screen. This processing unit 32 may also reconstruct the 3-D shape of an object from the directly transmitted component, using an algebraic reconstruction technique.

Figure 2:
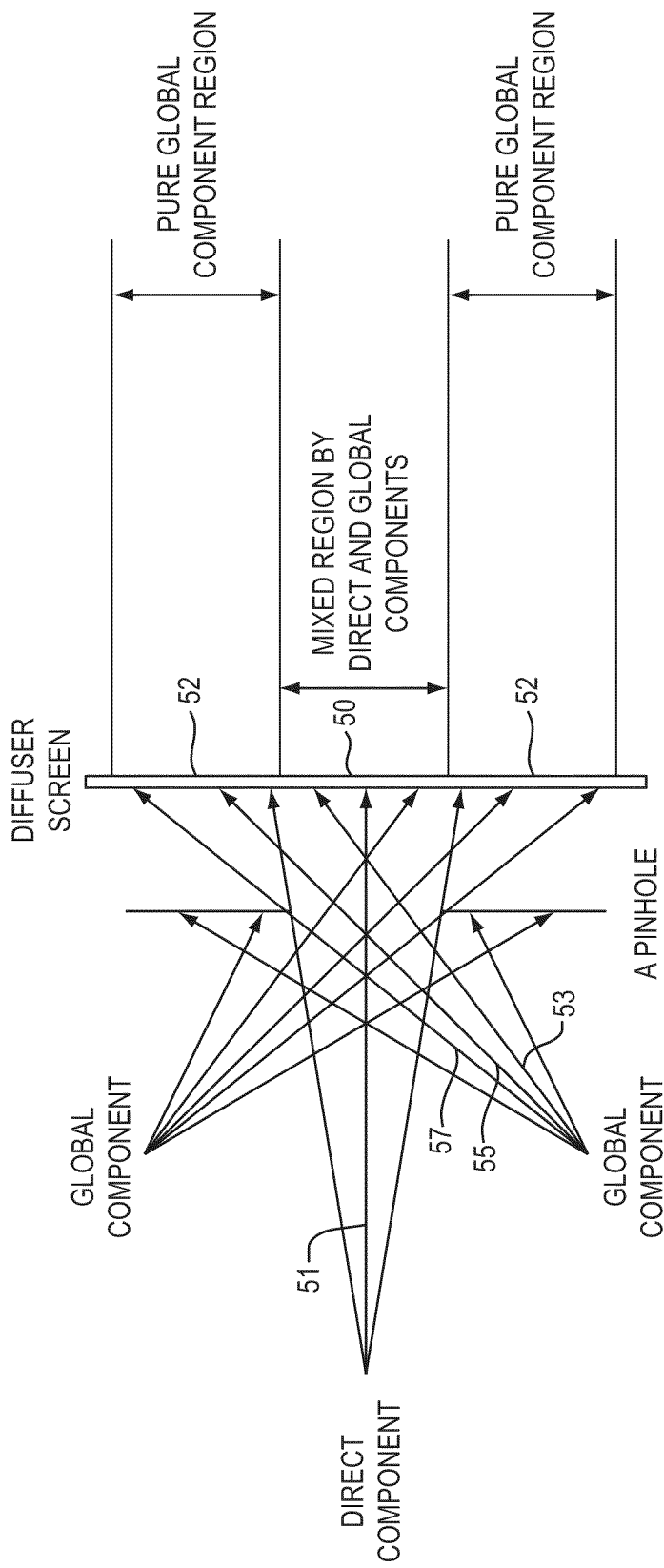
FIG. 2 is a diagram that shows light rays passing through a pinhole of a pinhole array mask and striking a diffuser screen at different angles.

FIG. 2 shows separation of light into direct and global components using a pinhole array mask, in an illustrative implementation of this invention. For each pinhole, the received light is greatest in a central region that surrounds the central pixel under the pinhole. This central region 50 may, for example, comprise 7×7 pixels. This central region 50 receives both directly transmitted light rays (e.g. light ray 51) and scattered light (e.g. light ray 53). In addition, light rays (e.g., 55, 57) from the pinhole also fall in an outer region 52 that surrounds the central region 50. In this outer region 52, the light rays (e.g., 55, 57) that pass through the pinhole and strike the diffuser-plane are (due to their angle) purely from scattered light. Thus, the light in the central region is mixed, with both a global and direct component; whereas the light in the outer region consists of a pure global component.

Thus, in FIG. 2, directly-transmitted rays impinge on a compact region below the pinhole, yet mix with scattered global rays. The received signal located away from the direct-only peak is due to scattered rays.

Figure 3:
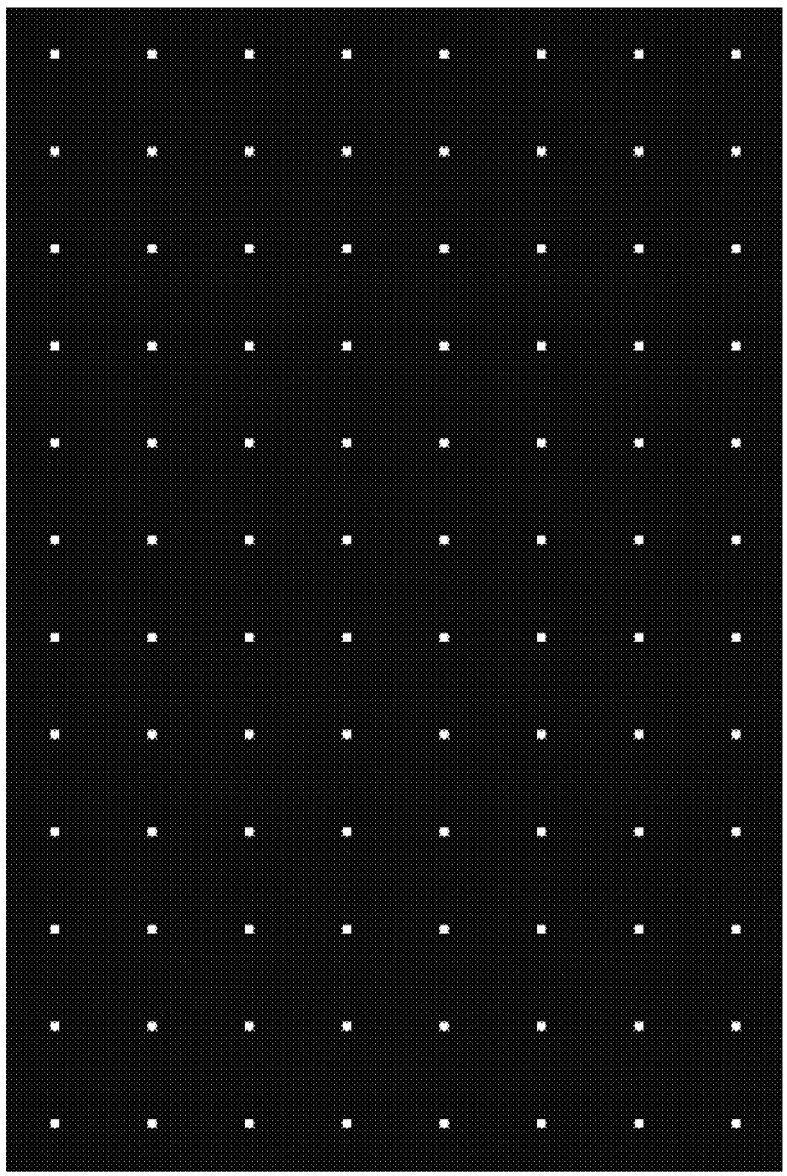
FIG. 3 is a diagram of a small section of a pinhole array mask.
Figure 5A:
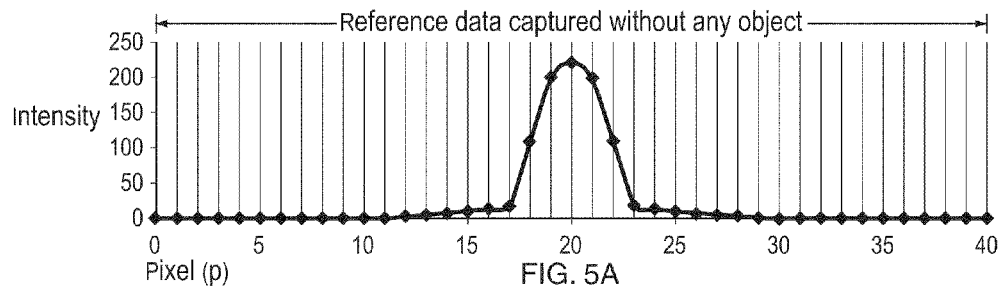
FIGS. 5A-5D show graphs of light intensity, in an illustrative implementation of this invention.
Figure 5B:
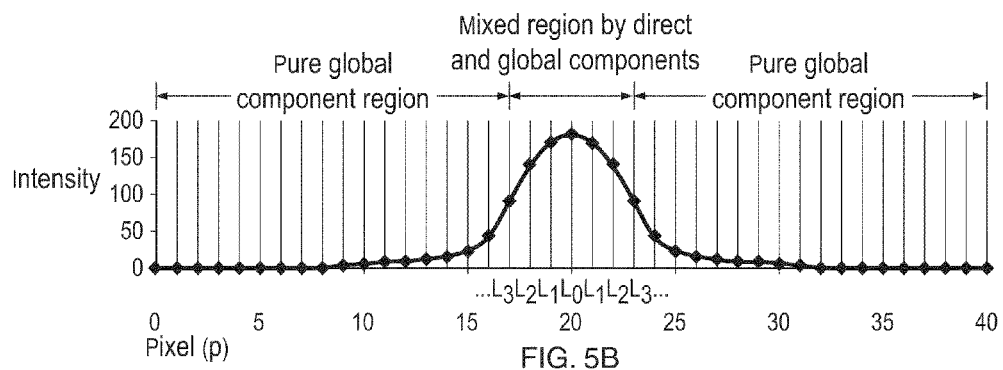
Figure 5C:
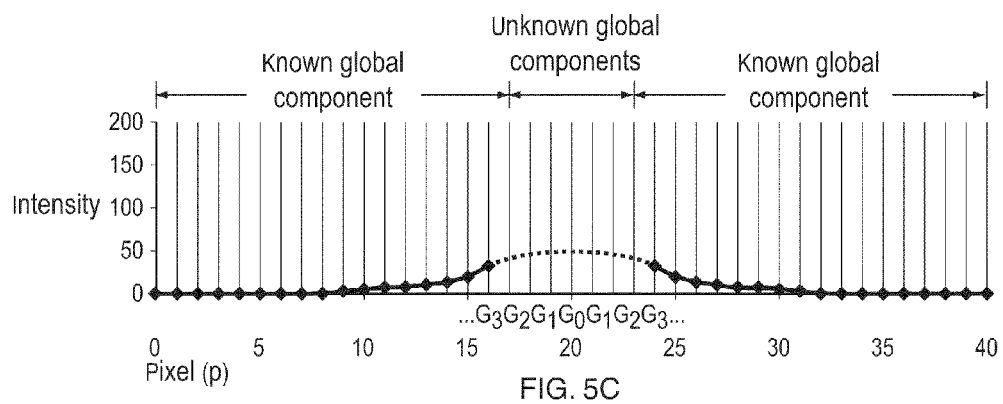
Figure 5D:
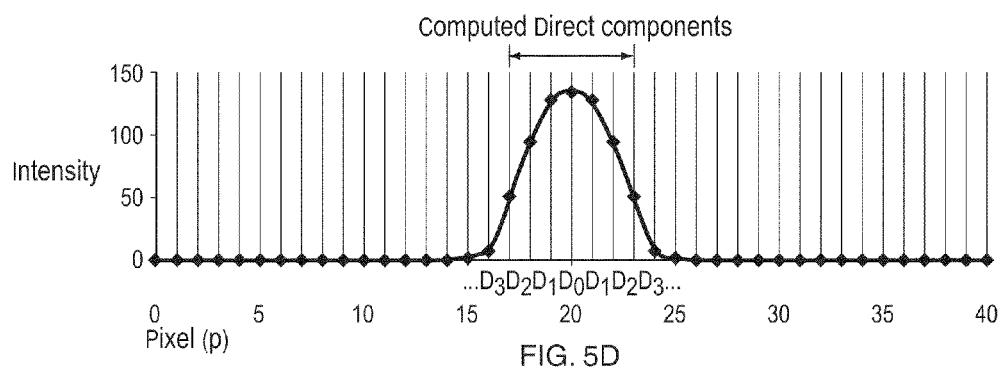

FIG. 3 shows a section of a pinhole array mask, in an implementation of this invention.

In an illustrative implementation of this invention, a mask is made by printing an array of 150×100 pinholes on a plastic substrate, with a pinhole diameter of 428 µm for each pinhole. A Canon® EOS Digital Rebel™ XSi 30 camera, with a resolution of 4272×2848 pixels, is used. The mask is separated from the diffuser in order to form an image of the scattering volume mapping to a 160×160 pixel region.

FIGS. 4A and 4B show the effect of scattering media on images captured with this pinhole mask/diffuser arrangement. For the pinhole images in FIG. 4A, there were no scattering media between the light source and the diffuser, whereas the pinhole images in FIG. 4B, there were such scattering media. The two graphs in the lower part of FIGS. 4A and 4B show the intensity of received light at various positions on the diffuser screen, with pixel 20 directly under a pinhole. For the graph in the lower portion of FIG. 4A, there are no scattering media between the light source and the diffuser, for the graph in the lower portion of FIG. 4B, there are.

As can be seen from FIGS. 4A and 4B, the diffuser-plane image consists of a set of sharp peaks under each pinhole in the absence of any scattering media between the light source and diffuser. As indicated by FIGS. 4A and 4B, a pinhole images extended, blurred patterns when a scattering object is placed between the light source and camera. When a scattering object is present, light rays from both directly transmitted light and globally-scattered light appear in the mixed central region (50 in FIG. 2) under each pinhole. This blurring of the received image would be impossible to separate without angular samples, which in this case are contributed by the pinhole array mask.

FIGS. 5A-5D comprise graphs of received light intensity, for light captured using an implementation of this invention with a pinhole mask. These graphs show received light intensity for: (a) FIG. 5A: a 1-D sensor image for a single LED illuminating a diffuser with no object present; (b) FIG. 5B: an image with a scattering object present; (c) FIG. 5C, measured values (solid line) and estimated polynomial fit (dashed line) for global-only component, and (d) FIG. 5D, a direct-only image formed by subtracting (b) from (c).

FIGS. 5A-5D indicate that there are two regions in an image under each pinhole; the first (central) region consists of a mixed signal due to cross-talk between the direct and global components. The second (outer) region represents a pure global component. As suggested by FIGS. 5A-5D, the angular sample in the central region (directly under each pinhole) can be used to estimate a direct plus global transmission along the ray between a given pixel and the light source. Similarly, any non-zero pixels in the outer region can be fully attributed to global illumination due to volumetric scattering.

According to principles of this invention, such angular samples may be analyzed to estimate separate direct and global components.

For ease of discussion, consider direct-global separation for a 1-D sensor and a 2-D scene. (The analysis, however, can be simply extended to 2-D sensors and 3-D volumes). As shown in the graph in FIG. 5B, a single pinhole image is defined as two separate regions, a pure global component region and a region of mixed direct and global components. We define the received intensity at each diffuser-plane pixel as $\{L_0, L_1, \ldots, L_n\}$, when a scattering object is placed between the light source and the diffuser. The individual sensor values are modeled as $$L_0 = G_0 + D_0 \qquad (1)$$
$$\vdots$$
$$L_n = G_n + D_n$$

In Equation 1, $\{G_n\}$ and $\{D_n\}$ represent the underlying global and direct intensities measured in the sensor plane, respectively.

In an exemplary implementation of this invention, the following algorithm may be used to estimate the direct and global components received at each pinhole. First, estimate a quadratic polynomial fit to the non-zero values in the outer region of a pinhole image. (In other words, in this first step, the central region—which is 7×7 pixels in this example—is excluded). Note that in this outside region, $L_i \approx G_i$. Second, use this polynomial model to approximate values of the global component $\{G_n\}$ in the central region directly below each pinhole; note that this central region is subject to mixing and the global component must be approximated from the global-only region. Third, estimate a direct-only image by subtracting, for each pixel in the central region, the estimated global component for such pixel from the measured value for such pixel, such that $D_0 \approx L_0 - G_0$.

In an exemplary implementation of this invention, direct signals $\{D_n\}$ and global signals $\{Gn\}$ in each pinhole region may be separated, as described above. By collecting and combining the direct signals in each pinhole region, a direct image (from direct signals only) may be obtained. A global image (from global signals only) is obtained by same process, where the original image is the sum of the direct and global values. The size of the direct and global images is the same as the pinhole resolution, because there is only one signal value for direct and global components for each pinhole region. For example, if the number of pinholes in the pinhole mask is 150×100, then the image size is 150×100.

Figure 6B:
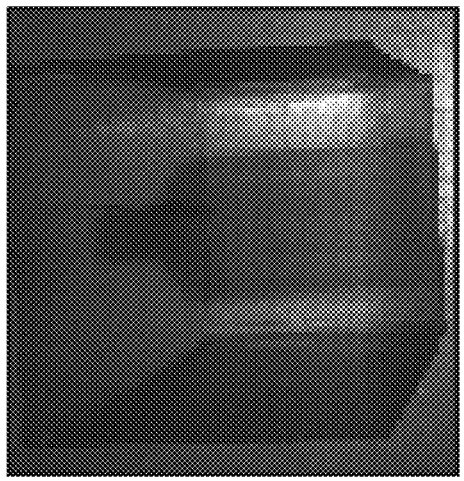
FIGS. 6A-6D are a set of photographs that illustrate the sharper image boundaries obtained with direct-only images, in an illustrative implementation of this invention.
Figure 6D:
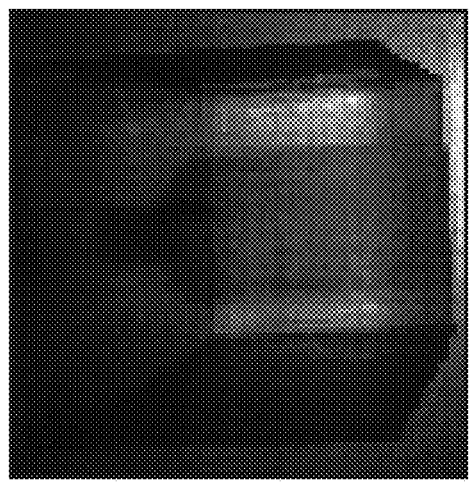
Figure 6A:
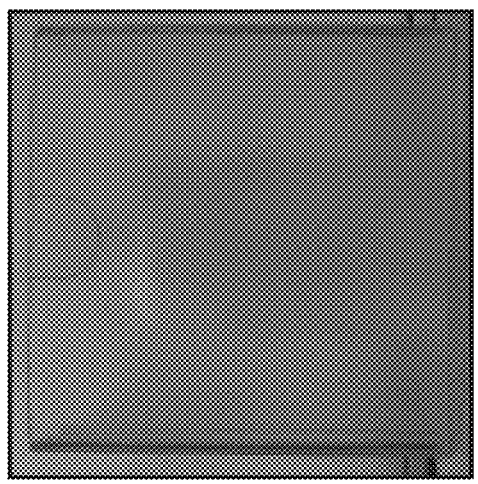
Figure 6C:
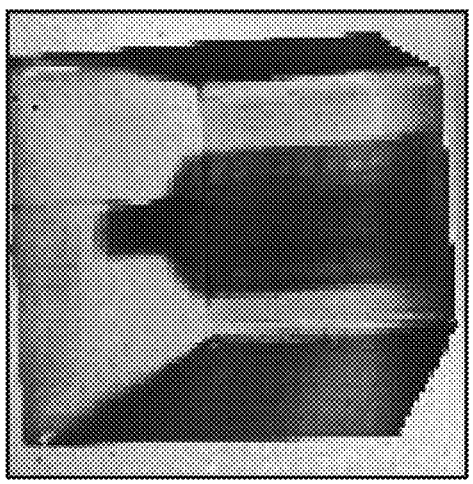

FIGS. 6A-6D illustrate the impact of separating direct and global components, in an implementation of this invention. In the images in FIGS. 6A and 6B, global and direct components are not separated, whereas in 6A and 6B, they are separated. FIG. 6A is an image of a scattering scene, comprising a semitransparent bottle enclosed in an acrylic box, taken using normal ambient light. FIG. 6B is an image cast on a diffuser when a single point light source is placed behind the scene. FIG. 6C is a recovered direct-only image found using angular-domain filtering allowed by a pinhole array mask placed close to the diffuser plane. Note that fine features and edges are more visible. FIG. 6D is an estimated global-only image using a pinhole array mask.

Figure 7D:
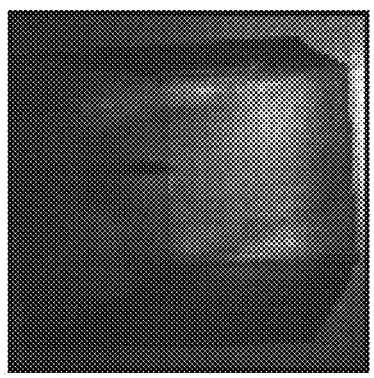
FIGS. 7A-7H are another set of photographs that illustrate the sharper image boundaries obtained with direct-only images, in an illustrative implementation of this invention.
Figure 7H:
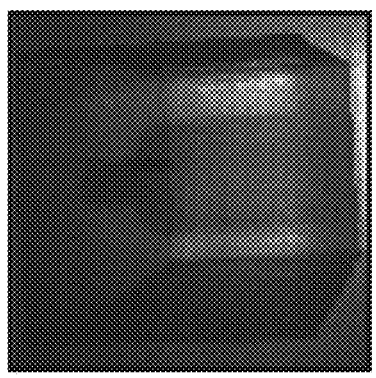
Figure 7C:
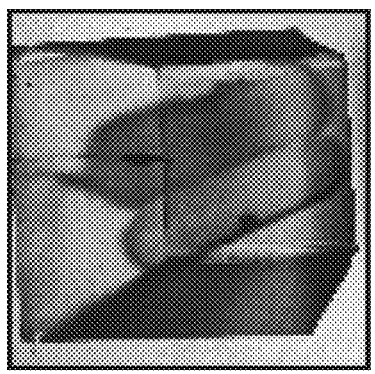
Figure 7G:
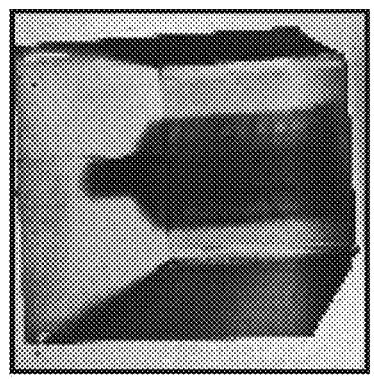
Figure 7B:
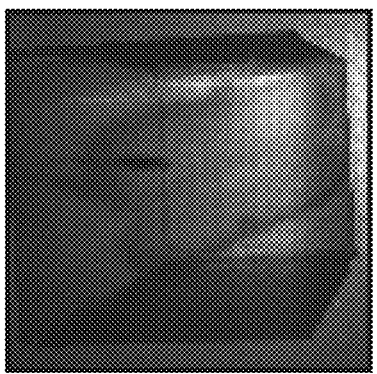
Figure 7F:
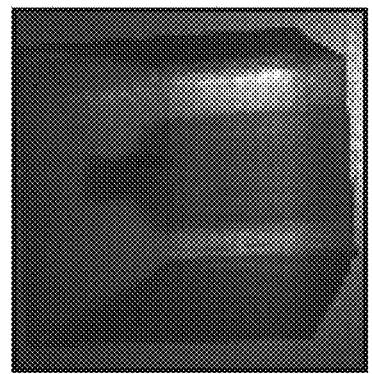
Figure 7A:
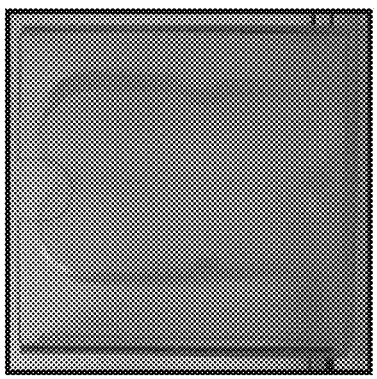
Figure 7E:
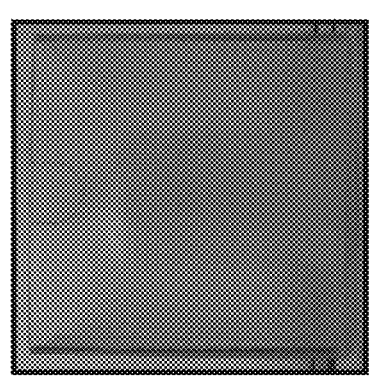

FIGS. 7A-7H also illustrate how the direct-only images are sharper. From left to right: (a) FIGS. 7A and 7E are images of an object, taken using normal ambient light, (b) FIGS. 7B and 7F are images taken without a pinhole array, (c) FIGS. 7C and 7G are direct-only images, and (d) FIGS. 7D and 7H are global-only images. Contrast has been enhanced for the direct-only images.

In an exemplary implementation of this invention, a conventional algebraic reconstruction technique (ART) may be used to reconstruct the 3-D shape of scattering objects. Generally, when a ray passes through an object, the change in intensity can be modeled by:

$$I = I_0 \exp\left(-\sum_{i=1}^{N} a_i f_i\right) \qquad (2)$$

Figure 8:
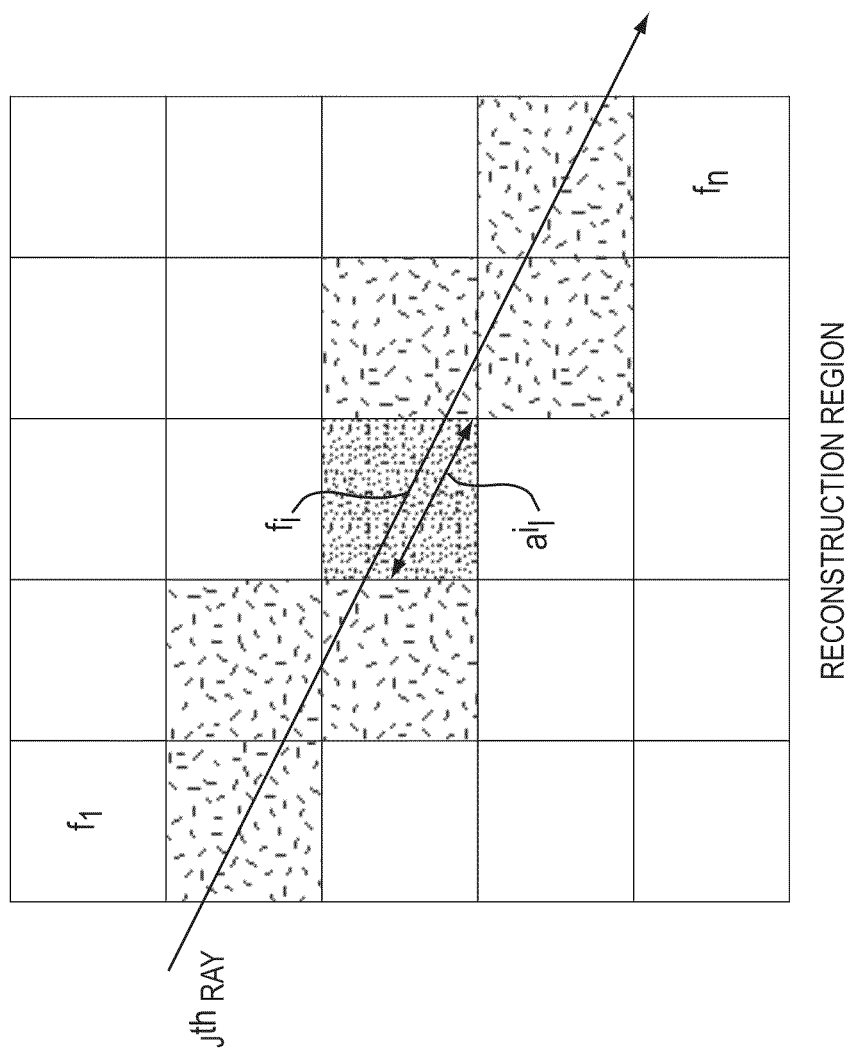
FIG. 8 shows a projection model of a light ray.

In Equation (2), $I_0$ is the original intensity of the ray and I is the resultant intensity after penetrating N layers inside the object. In this equation, $a_i$ means the distance penetrating at $i^{th}$ material of which absorption coefficient is $f_i$ as depicted in FIG. 8. Equation (3) is the logarithmic expression of Equation (2).

$$h = \log(I_0/I) = \sum_{i=1}^{N} a_i f_i \qquad (3)$$

Note that Equation (3) can be rewritten for the $j^{th}$ ray as follows.

$$h^j(t) = \sum_{i=1}^{N} a_i^j f_i \qquad (4)$$

The next step is to find $f_i$ values which correspond to the density information within the reconstruction region. Equation (4) can be described using Equation (5) in matrix form. A matrix represents the projective geometry of rays calculated for the emitting position of rays, and the received position for a predetermined reconstruction region in which the object is assumed to be placed. The vector h is related to the sensed intensity values.

$$h = AF \qquad (5)$$

$$\text{where } A = \begin{bmatrix} a_1^1 & a_2^1 & \dots & a_N^1 \\ a_1^2 & a_2^2 & \dots & a_N^2 \\ \vdots & \vdots & \dots & \vdots \\ a_1^M & a_2^M & \dots & a_N^M \end{bmatrix} \begin{bmatrix} a^1 \\ a^2 \\ \vdots \\ a^M \end{bmatrix}$$

$$F \in R^N, \quad h \in R^M, \quad A \in R^{M \times N}$$

The following equation may be used to get the next step value, $f_i(t+1)$, from the parameters at the current $i^{th}$ step.

$$f_i(t+1) = f_i(t) + \lambda \frac{g^j - h^j(t)}{\sum_i^N (a_i^j)^2} a_i^j \qquad (6)$$

In Equation 6, t and $\lambda$ are the step index and a coefficient related with convergence parameter, respectively. The values of g and h are the measured value from sensing and the calculation value from Equation (5) using f at the current step. As the iteration step, t, increases, the error term, $g^j - h^j(t)$, decreases and $f_i(t)$ gets closer to the exact value. Finally, this gives the approximated reconstruction result, f.

$$f_i(t+1) = f_i(t) + \lambda \frac{g^j - h^j(t)}{\sum_i^N (a_i^j)^2} a_i^j$$

Figure 9:
FIG. 9 is an image obtained by 3D reconstruction, in an illustrative implementation of this invention.
Figure 10D:
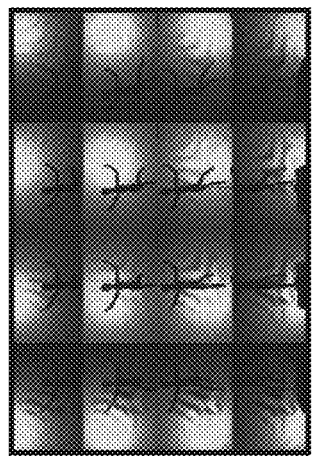
FIGS. 10A to 10G show multi-view images generated from a single shot, in an illustrative implementation of this invention.
Figure 10G:
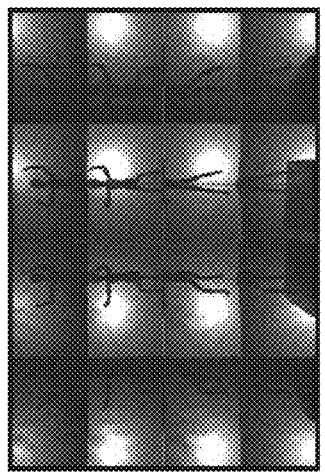
Figure 10C:
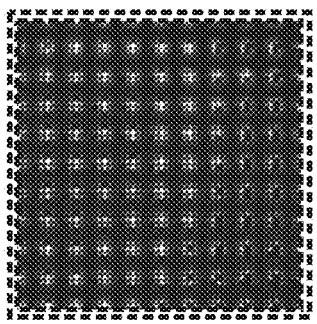
Figure 10F:
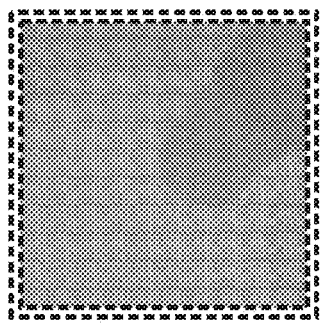
Figure 10B:
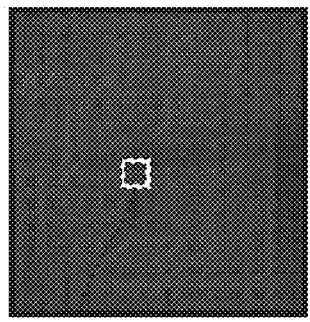
Figure 10E:
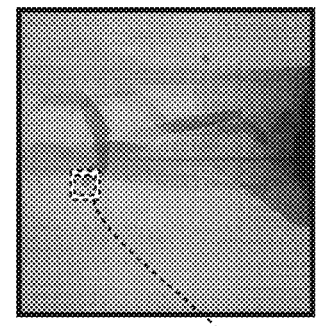
Figure 10A:
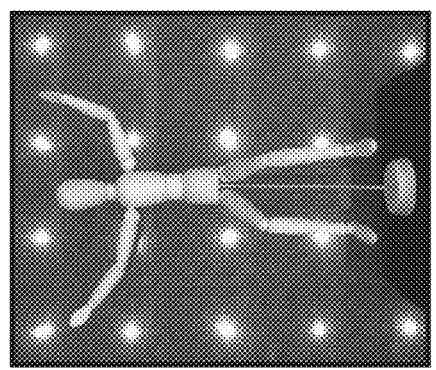
Figure 11A:
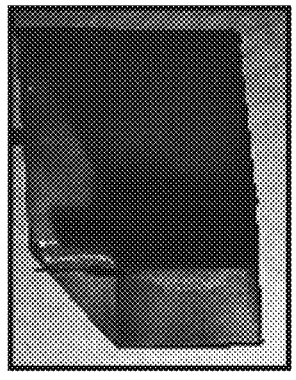
FIGS. 11A to 11H are a set of photographs that comprise temporally-multiplexed images for which the position of the backlight changed over time by turning on and off LEDs, in an illustrative implementation of this invention.
Figure 11B:
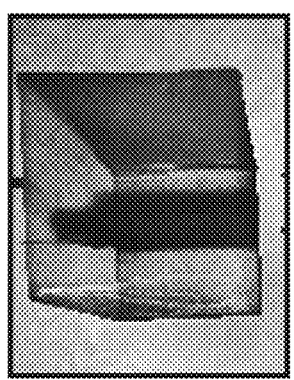
Figure 11C:
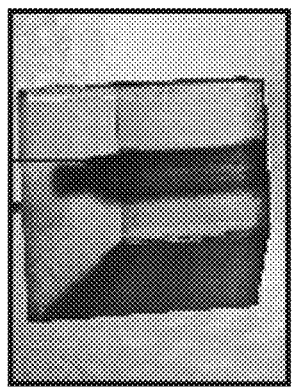
Figure 11D:
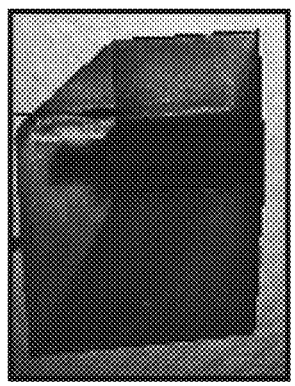
Figure 11E:
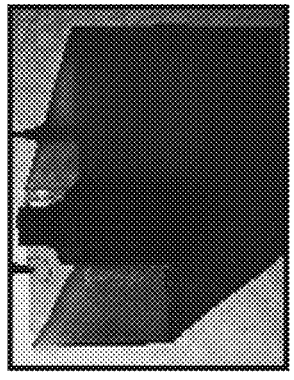
Figure 11F:
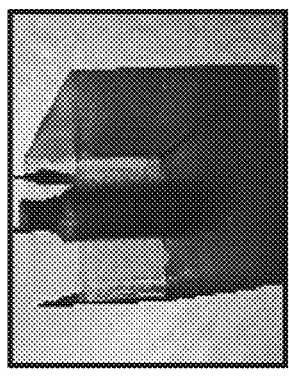
Figure 11G:
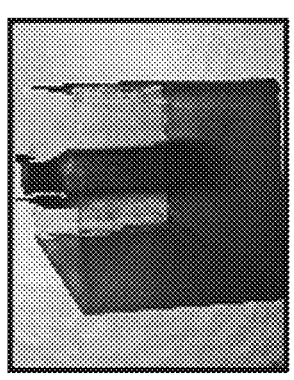
Figure 11H:
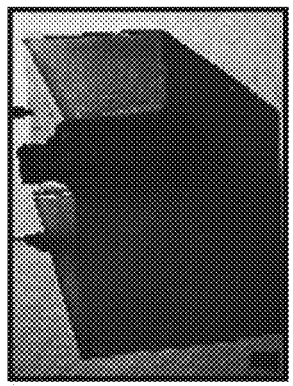

FIG. 9 is an image obtained by 3D reconstruction using the ART technique, in an illustrative implementation of this invention.

It is desirable in some cases to achieve direct-global separation from a single exposure. According to principles of this invention, multi-view images obtained from a single exposure may be used to calculate global and direct components of received light. FIGS. 10A-10G show multi-view images generated from a single shot, in an illustrative implementation of this invention.

Multiple images may also be taken over a period of time, in such a way that the position of the light source relative to the imaging sensor changes during that period. These temporally-multiplexed images with a translated light source may be used to advantage for tomographic reconstruction of a 3D shape. The movement of the light source over time may be achieved by turning on and off different LEDs. FIGS. 11A-11H are a set of photographs that comprise temporally-multiplexed images wherein the position of the backlight changed over time by turning on and off LEDs, in an illustrative implementation of this invention.

In an illustrative implementation of this invention, 3-D shapes of translucent objects may be reconstructed using conventional limited baseline tomography. In that case, a limited baseline (rather than a full 360 degree turntable sequence) may be used.

The ASCII text file that is incorporated by reference herein (name of file: DirectScatteredComponentsSourceCode.txt; date of creation: Nov. 30, 2009, size of file: 17,008 bytes) comprises source code for an exemplary implementation of this invention that employs an array of pinholes. The source code includes algorithms for descattering.

Figure 12:
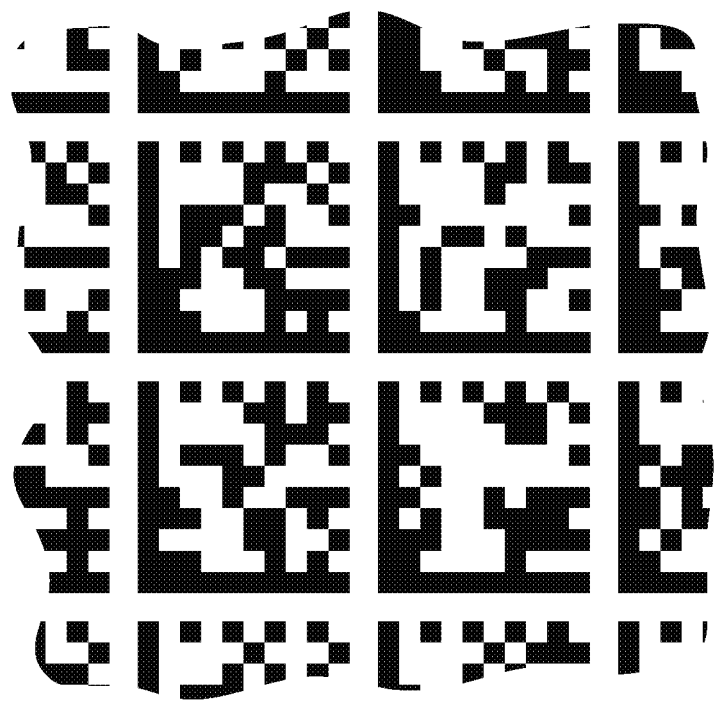
FIG. 12 is an illustration of a MURA tile, in an illustrative implementation of this invention.

Rather than a pinhole array, other spatial light modulators may be used. For example, this invention may be implemented in such a manner that a pattern of MURA (Modified Uniformly Redundant Array) tiles is used as a spatial light modulator. An advantage of a MURA pattern is that it causes less attenuation of light than a pinhole array, thus allowing faster exposure times and facilitating dynamic applications. In the case of a pinhole array, angular samples of light rays are obtained in the spatial domain. In contrast, with a MURA pattern, angular sampling is done in the frequency domain. FIG. 12 is an illustration of a MURA tile, in an illustrative implementation of this invention. Also, for example, other tiled-broadband patterns may be used as a spatial light modulator.

This invention may be implemented in such a manner that a lenslet array, instead of a pinhole mask, is placed in front of an image sensor. Lenslet arrays allow faster exposure times than pinhole masks.

3-D reconstruction of light-scattering objects, in accordance with principles of this invention, may be applied to medical imaging and to computer vision.

For example, some parts of biological organisms, including human fingers, comprise scattering and translucent materials. As a result, it is possible to view the inner 3-D shape of these parts of organisms with visible-wavelength light, in accordance with principles of this invention. Such visible-wavelength imaging is less hazardous than X-ray imaging.

This invention may be applied to advantage to verify personal identity, by detecting 3D finger vein patterns. Vein patterns are different for each finger and for each person. Because they are hidden underneath the skin's surface, forgery is extremely difficult. Also, they are not changed by aging, unlike other major biometrics such as fingerprint, face and voice.

Figure 13:
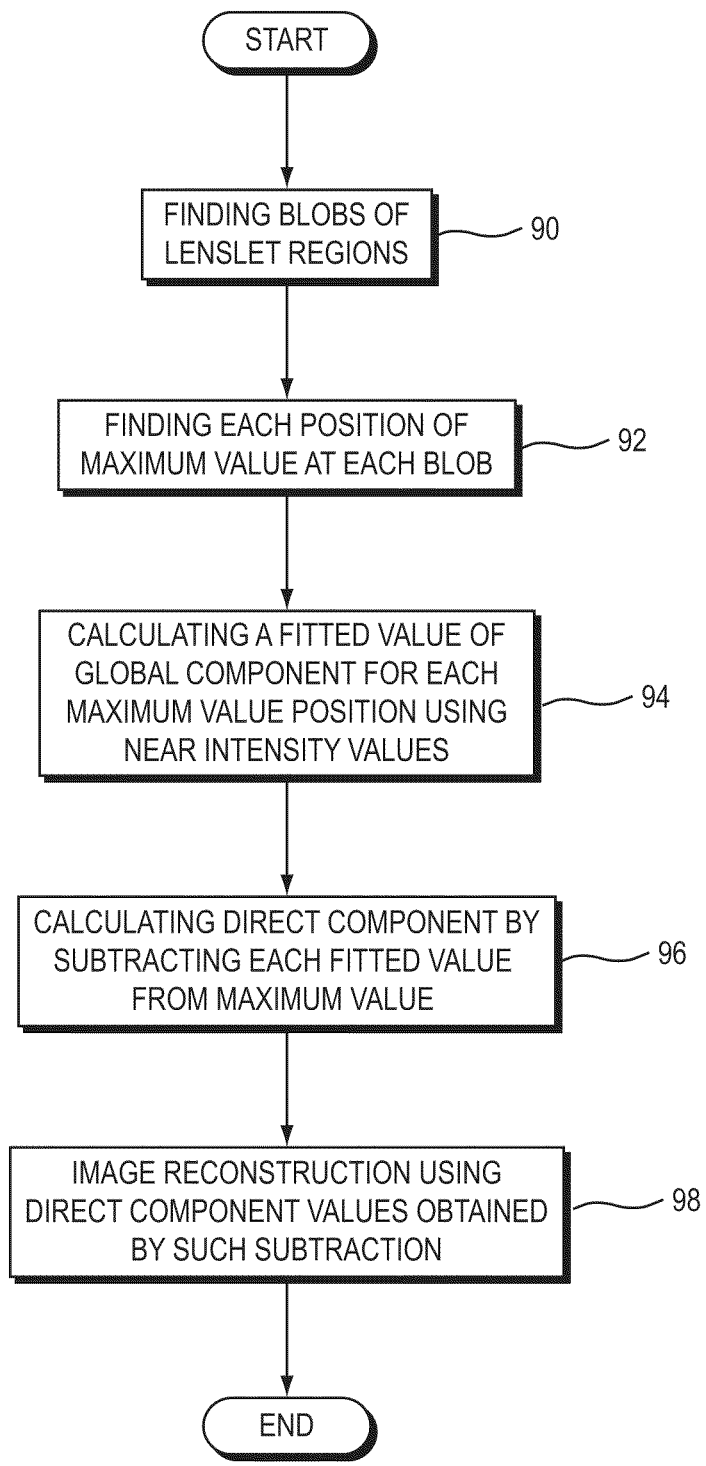
FIG. 13 shows an algorithm for image reconstruction using direct components of light, in an implementation of this invention.

FIG. 13 shows an algorithm for image reconstruction using direct components of light, in an implementation of this invention. Find blobs of lenslet regions 90. Find each position of maximum value at each blob 92. Calculate a fitted value of global component for each maximum value position using near intensity values 94. Calculate direct component by subtracting each fitted value from maximum value 96. Reconstruct image using direct component values obtained by such subtraction 98.

Figure 14:
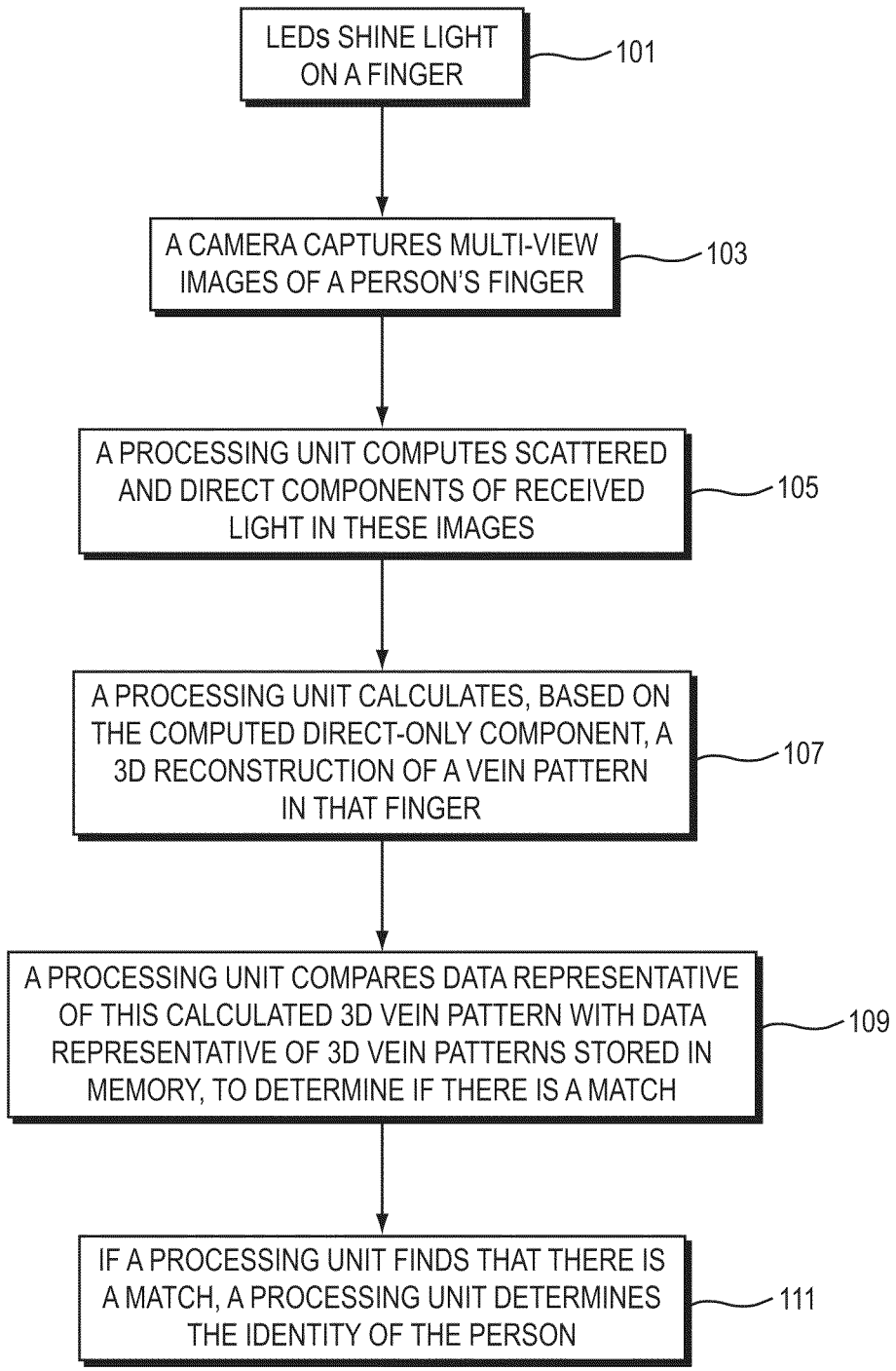
FIG. 14 is a flow chart that illustrates a method for verifying a person's identity, based on a 3D finger vein pattern, in an implementation of this invention.

FIG. 14 is a flow chart that illustrates a method for verifying a person's identity, based on a 3D finger vein pattern, in an implementation of this invention. The method comprises the following steps. First, a light-emitting device (LED) shines light on a person's finger 101. Second, a camera captures multi-view images of the finger 103. Third, a processing unit computes scattered and direct components of received light in these images 105. Fourth, a processing unit calculates, based on the computed direct-only component, a 3D reconstruction a vein pattern in that finger 107. Such reconstruction may be based on a standard algebraic reconstruction technique. Fifth, a processing unit compares data representative of this calculated 3D vein pattern with data representative of 3D vein patterns stored in memory, to determine if there is a match 109. Fifth, if a processing unit finds that there is a match, a processing unit determines the identity of the person 111.

In this implementation of this invention, the person's finger is a scattering and translucent object. An array of LEDs may be used as the light source. Also, the multi-view images may be captured in a single-shot exposure (e.g., with all the LEDs turned on) or may instead by captured in temporally-multiplexed images with a translated light source. The translation of the light source may be achieved by turning on just one LED at a time, and changing which LED is on in different exposures. The wavelength of the measured light may vary. For example, in some implementations, the wavelength may be in a range visible to human perception; and in other implementations, the wavelength may be in the near infrared range.

Finally, some definitions: "Solely" means solely or substantially solely. "Only" means only or substantially only.

CONCLUSION

It is to be understood that the methods and apparatus which have been described above are merely illustrative applications of the principles of the invention. Numerous modifications may be made by those skilled in the art without departing from the scope of the invention. The scope of this invention is limited only by the claims that follow.

What is claimed is:

1. Apparatus comprising a camera, a processor, and a plurality of optical elements, wherein:
the apparatus is adapted to analyze light from a scene, which light comprises a direct component and a global component, the direct component being light that travels directly to the apparatus from the scene, and the global component being light that is scattered before reaching the apparatus and that does not travel directly from the scene to the apparatus;

the plurality of optical elements are configured to create a plurality of images when light from the scene passes though the plurality of optical elements during an exposure, each respective image (out of the plurality of images) is created by the light passing through a respective optical element (out of the plurality of optical elements) and consists of a first region and a second region;

light in the first region consists of only the global component;

light in the second region comprises both the direct component and the global component;

and the processor is configured to compute, based on sensor measurements of light in the first region, a function that approximates intensity of the global component, to determine, based on the function, an estimated intensity of the global component in the second region, to determine, based on sensor measurements of light in the second region, a measured intensity of the global component plus the direct component, and to estimate intensity of the direct component by subtracting the estimated intensity of the global component in the second region from the measured intensity of the global plus direct components in the second region.

2. The apparatus of claim 1, wherein the optical elements comprise areas of a spatial light attenuator that are configured to allow the light from the scene to pass through the areas.

3. The apparatus of claim 1, wherein the optical elements comprise pinholes.

4. The apparatus of claim 1, wherein the optical elements comprise tiles in a tiled broadband code that allow light from the scene to pass through the tiles.

5. The apparatus of claim 1, wherein the optical elements comprise lenslets.

6. The apparatus of claim 1, wherein the function has an argument that is indicative of spatial position.

7. The apparatus of claim 1, wherein the first and second regions are in the spatial domain.

8. The apparatus of claim 2, wherein:
(a) the plurality of images form on a diffuser and are imaged by the camera; and
(b) the diffuser is optically closer to the camera than the spatial light attenuator.

9. The apparatus of claim 7, wherein the first region surrounds the second region.

10. The apparatus of claim 8, wherein the first and second regions are in the frequency domain.

11. The apparatus of claim 1, wherein the apparatus is configured to take a series of exposures during a period of time while an illumination source that illuminates the scene is translated relative to the apparatus.

12. The apparatus of claim 10, wherein the first region surrounds the second region.

13. The apparatus of claim 12, wherein the object in the scene is enveloped in a solid.

14. The apparatus of claim 12, wherein the object comprises finger veins.

15. The apparatus of claim 1, wherein the apparatus is adapted to perform angular sampling in the spatial domain.

16. The apparatus of claim 4, wherein the apparatus is adapted to perform angular sampling in the frequency domain.

17. A method of using apparatus to analyze light from a scene, wherein:

the light comprises a direct component and a global component, the direct component being light that travels directly to the apparatus from the scene, and the global component being light is scattered before reaching the apparatus and that does not travel directly from the scene to the apparatus;

the apparatus comprises a camera, a processor, and a plurality of optical elements, the plurality of optical elements create a plurality of images when light from the scene passes though the plurality of optical elements during an exposure, each respective image (out of the plurality of images) is created by the light passing through a respective optical element (out of the plurality of optical elements) and consists of a first region and a second region;

light in the first region consists of only the global component;

light in the second region comprises both the direct component and the global component; and the processor computes, based on sensor measurements of received light in the first region, a function that approximates intensity of the global component, determines, based on the function, an estimated intensity of the global component in the second region, determines, based on sensor measurements of received light in the second region, a measured intensity of the global component plus the direct component, and estimates intensity of the direct component by subtracting the estimated intensity of the global component in the second region from the measured intensity of the global plus direct components in the second region.

18. Apparatus comprising a camera, a processor, a diffuser, and a plurality of optical elements, wherein:

the apparatus is adapted to analyze light from a scene, which light comprises a direct component and a global component, the direct component being light that travels directly to the apparatus from the scene, and the global component being light that is scattered before reaching the apparatus and that does not travel directly from the scene to the apparatus;

the diffuser is optically closer to the camera than the optical elements;

the plurality of optical elements are configured to create a plurality of images on the diffuser when light from the scene passes though the plurality of optical elements during an exposure, each respective image (out of the plurality of images) is created by the light passing through a respective optical element (out of the plurality of optical elements) and consists of a first region and a second region;

light in the first region consists of only the global component;

light in the second region comprises both the direct component and the global component;

and the processor is configured to compute, based on sensor measurements of light in the first region, a function that approximates intensity of the global component, to determine, based on the function, an estimated intensity of the global component in the second region, to determine, based on sensor measurements of light in the second region, a measured intensity of the global component plus the direct component, and to estimate intensity of the direct component by subtracting the estimated intensity of the global component in the second region from the measured intensity of the global plus direct components in the second region.

19. The apparatus of claim 18, wherein the apparatus is configured to perform angular sampling of the light in a frequency domain.

20. The apparatus of claim 19, wherein the optical elements comprise tiles in a tiled broadband code.

* * * * *